United States Patent
Pal et al.

(10) Patent No.: US 9,467,179 B2
(45) Date of Patent: Oct. 11, 2016

(54) VEHICLE HEAD UNIT PRIORITY

(71) Applicants: General Motors LLC, Detroit, MI (US); GM Global Technology Operations LLC, Detroit, MI (US)

(72) Inventors: Dipankar Pal, Sylvania, OH (US); Lakshmi Thanayankizil, Rochester Hills, MI (US); Jonathan L. Gerlach, Canton, MI (US); Muhammad Fahad Alam, Macomb, MI (US)

(73) Assignees: General Motor LLC, Detroit, MI (US); GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 14/164,721

(22) Filed: Jan. 27, 2014

(65) Prior Publication Data
US 2015/0215954 A1   Jul. 30, 2015

(51) Int. Cl.
*H04B 1/08* (2006.01)
*H04W 88/08* (2009.01)
*H04W 84/00* (2009.01)

(52) U.S. Cl.
CPC .............. *H04B 1/086* (2013.01); *H04W 88/08* (2013.01); *H04W 84/005* (2013.01)

(58) Field of Classification Search
CPC .............. H04W 84/00; H04W 76/025; H04L 12/5692
See application file for complete search history.

(56) References Cited

U.S. PATENT DOCUMENTS

| | | | |
|---|---|---|---|
| 2006/0293813 A1* | 12/2006 | Nou | 701/33 |
| 2007/0094366 A1* | 4/2007 | Ayoub | H04L 29/06027 709/223 |
| 2008/0147410 A1* | 6/2008 | Odinak | G10L 15/26 704/270.1 |
| 2010/0235891 A1* | 9/2010 | Oglesbee et al. | 726/5 |
| 2013/0024060 A1* | 1/2013 | Sukkarie et al. | 701/22 |
| 2013/0084836 A1* | 4/2013 | Guenkova-Luy et al. | 455/414.1 |
| 2013/0143495 A1* | 6/2013 | Ricci | 455/41.2 |
| 2013/0289819 A1* | 10/2013 | Hassib et al. | 701/29.6 |
| 2014/0194056 A1* | 7/2014 | Barrett et al. | 455/41.1 |

* cited by examiner

*Primary Examiner* — Shaq Taha
(74) *Attorney, Agent, or Firm* — Christopher DeVries; Reising Ethington P.C.

(57) ABSTRACT

A system and a method using that system that provides multi-tainment services in a vehicle. The method includes the steps of providing a vehicle telematics unit having wireless hotspot functionality; connecting the telematics unit via short range wireless communication (SRWC) to a vehicle multi-tainment unit (VMU) and at least one mobile device; identifying the VMU connection at the telematics unit; and providing the VMU with wireless hotspot data priority over the at least one mobile device.

15 Claims, 4 Drawing Sheets

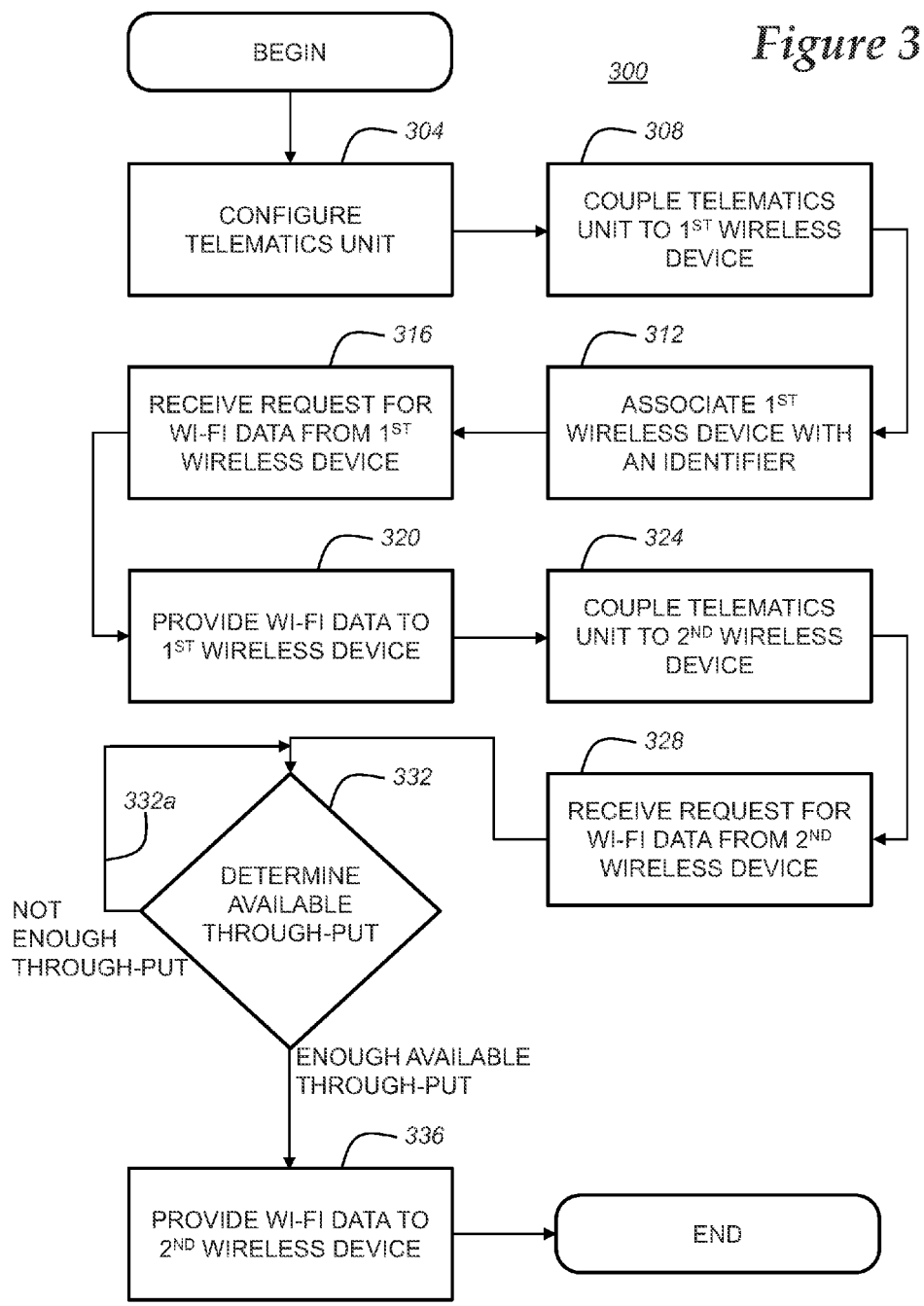

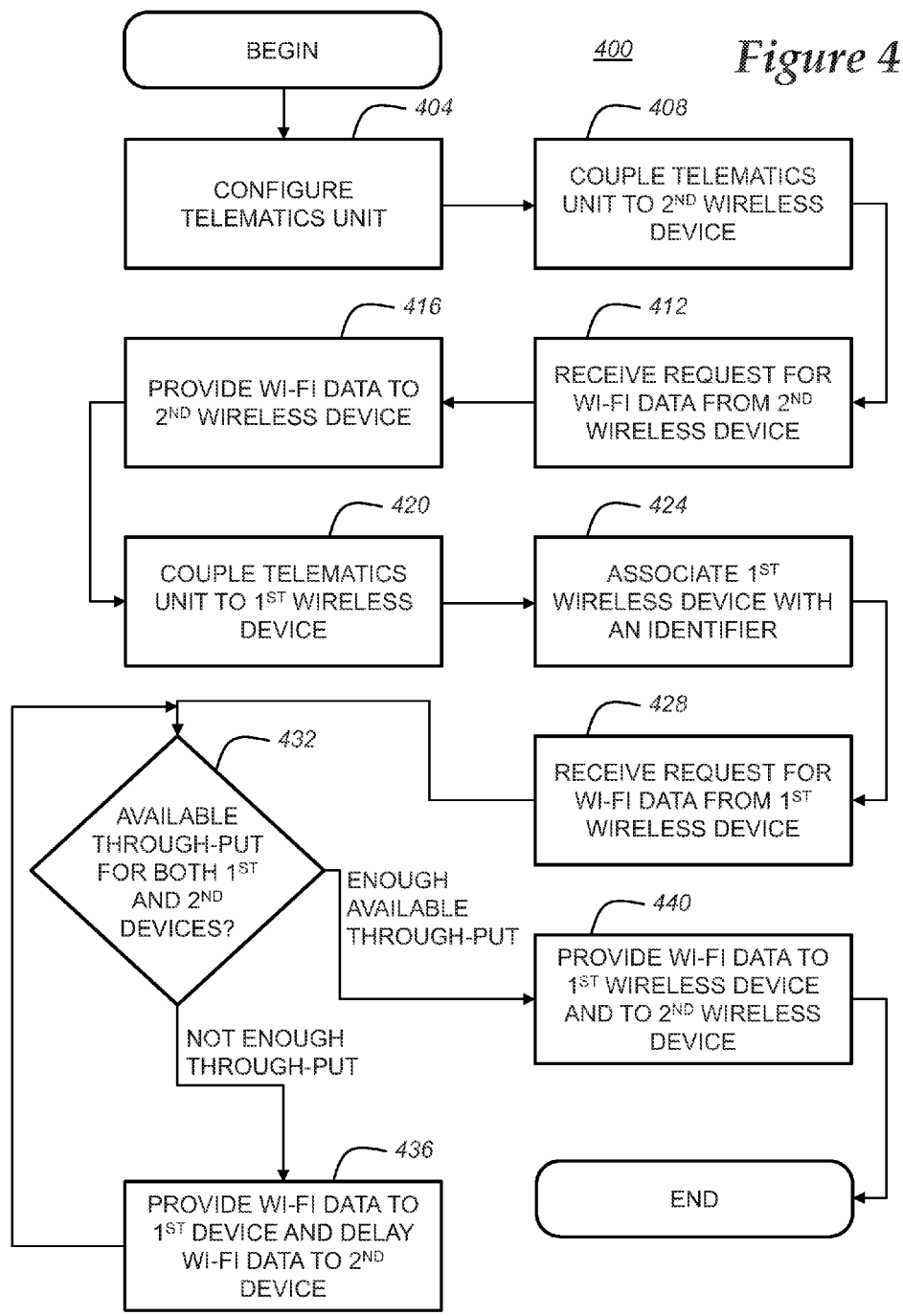

VEHICLE HEAD UNIT PRIORITY

TECHNICAL FIELD

The present invention relates to a wireless hotspot onboard a vehicle.

BACKGROUND

Vehicle occupants are increasingly desiring greater access to entertainment data and applications while in their vehicles. Vehicles are capable of storing some of this data or applications. At other times, it may be desirable to acquire this data from a remote source.

For a number of years, entertainment data was received by a vehicle head unit via analog radio waves enabling vehicle occupants to listen to a variety of AM and FM radio stations. More recently, improvements to vehicle head units have enabled more modern head units to receive digital data including cloud server data and/or satellite radio—which may include streaming audio or video.

SUMMARY

According to an embodiment of the invention, there is provided a method of providing multi-tainment services in a vehicle. The method includes the steps of providing a vehicle telematics unit having wireless hotspot functionality; connecting the telematics unit via short range wireless communication (SRWC) to a vehicle multi-tainment unit (VMU) and at least one mobile device; identifying the VMU connection at the telematics unit; and providing the VMU with wireless hotspot data priority over the at least one mobile device.

According to another embodiment of the invention, there is provided a method of providing wireless hotspot data from a vehicle telematics unit to devices in or near a vehicle. The method includes the steps of providing a vehicle telematics unit having wireless hotspot functionality and having a predetermined total wireless hotspot data bandwidth; connecting the telematics unit via short range wireless communication (SRWC) to a vehicle multi-tainment unit (VMU) and a mobile device; using a unique identifier associated with the VMU, identifying the VMU connection at the telematics unit; and providing the VMU with wireless hotspot data priority over the mobile device, wherein at any time the VMU and the mobile device request simultaneous delivery of wireless hotspot data, the VMU is provided wireless hotspot data at a preferred data rate.

BRIEF DESCRIPTION OF THE DRAWINGS

One or more embodiments of the invention will hereinafter be described in conjunction with the appended drawings, wherein like designations denote like elements, and wherein:

FIG. 3 is a flow diagram illustrating one embodiment of using the system shown in FIG. 1; and FIG. 4 is a flow diagram illustrating another embodiment of using the system shown in FIG. 1.

DETAILED DESCRIPTION OF THE ILLUSTRATED EMBODIMENT(S)

The system and method(s) described below pertain to various devices in a vehicle which may communicate wirelessly with a vehicle telematics unit acting as a wireless hotspot to receive wireless data thereby (e.g., utilizing Wi-Fi technology). One of these devices may be a vehicle head unit or vehicle multi-tainment unit (VMU) 100; other examples of devices may include mobile devices 96 such as Smart phones, tablet computers, etc. In some instances, the telematics unit may be able to provide uninterrupted wireless hotspot data to all the devices at the vehicle and each of the devices may receive the data at preferred data rates. At other times, the requested wireless hotspot data may exceed the throughput capabilities of the telematics unit, or at least the data rates to each of the devices may be less than desirable. This may occur for a variety of reasons—e.g., the number of devices utilizing the telematics unit's wireless hotspot capabilities or the volume of requested wireless hotspot data (e.g., data streaming to multiple devices). The present disclosure pertains to granting priority to the VMU in circumstances where the wireless hotspot data demand is greater than throughput capability of the telematics unit.

The system and the various methods carried out by the system are described below in greater detail. In addition, the operating environment is described below.
Communications System—

Figure 1:
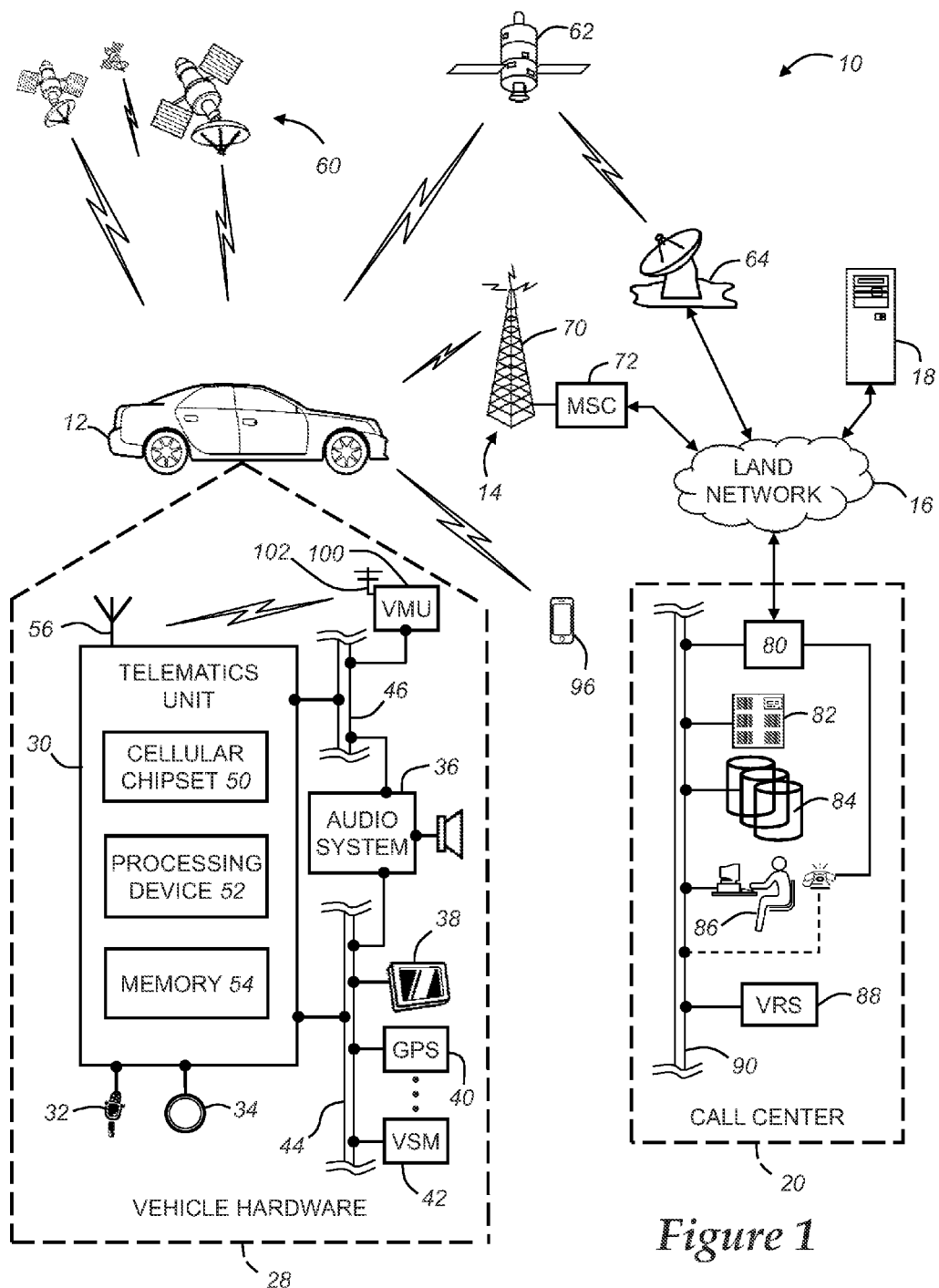
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 96) can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

In at least one implementation, the telematics unit 30 may have wireless hotspot hotspot functionality and may be configured, at least in part, as a wireless hotspot device; i.e., the telematics unit may provide a wireless local area network (WLAN) allowing various devices equipped with suitable SRWC capability to communicate therewith. The hardware and software configuration of the telematics unit to enable such capability is known to skilled artisans. One implementation of wireless hotspot technology may include Wi-Fi technology.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 may also include a communication device such as a vehicle head unit or vehicle multitainment unit (VMU) 100 which may include some of the vehicle electronics previously discussed (e.g., the audio system 36, the visual display 38, etc.). As used herein, the VMU 100 may include all suitable electronics, software, etc. for providing vehicle entertainment and vehicle infotainment services to the vehicle users and/or occupants. In some instances, the VMU 100 is electronically coupled to (and in communication with) the telematics unit 30 (e.g., via bus 46). The unit 100 may be modular or may be embedded within the vehicle 12. In addition, the VMU 100 may be integrated (e.g., a fixture) within the vehicle or in some circumstances may be detachably fixed or detachably tethered. Furthermore, the VMU 100 may have a SRWC antenna 102 and suitable electronic SRWC circuitry enabling SRWC with the telematics unit 30 (e.g., Bluetooth or Wi-Fi Direct, just to name a couple examples). The VMU may further include its own processor and memory; the memory may store any suitable software, firmware, etc. for VMU operation and/or interaction with telematics unit 30. Thus, the VMU may receive remote or cellular data via the telematics unit 30 and provide this data in the form of wireless hotspot data to various SRWC-equipped devices in or near the vehicle—e.g., by connecting to the Internet, other mobile devices 96, the call center 20, and/or various remotely located servers and computers 18. Examples of VMUs include interactive displays in the vehicle instrument panel, interactive displays embedded within the backing of vehicle seating or the vehicle headliner, and other interactive vehicle devices/displays that are portable.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

In at least one implementation, the computer 18 may include a cloud server which may be capable of storing, accessing, and/or sharing electronic data stored therein. Electronic data may include a variety of data files or computers program instructions, for example, among other things, data files, data programs, software, and/or executable applications. The data files may be related to information, entertainment, or any other suitable data. In some instances, the applications may be operative from the server rather than being required to be installed on an individual computer or within the vehicle 12—e.g., within the telematics unit 30 or within the VMU 100. Skilled artisans will appreciate the multiplicity of ways to utilize server computing (e.g., but not limited to: database servers, file servers, mail servers, print servers, web servers, gaming servers, etc.).

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 96. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. The hardware of the mobile device 96 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The mobile device hardware also may include a display, a keypad (e.g., push button and/or touch screen), a microphone, one or more speakers, motion-detection sensors (such as accelerometers, gyroscopes, etc.), and a camera.

In addition to the aforementioned features, modern mobile devices may support additional services and/or functionality such as short messaging service (SMS or texts), multimedia messaging service (MMS), email, internet access, as well as business and gaming applications.

Non-limiting examples of the mobile device 96 include a cellular telephone, a personal digital assistant (PDA), a Smart Phone, a personal laptop computer or tablet computer having two-way communication capabilities, a netbook computer, or any suitable combinations thereof. The mobile device 96 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile device 96 and the vehicle 12 may be used together by a person known as the vehicle user such as the driver. However, the vehicle user does not need to be the driver of the vehicle 12 nor does the vehicle user need to have ownership of the mobile device 96 or the vehicle 12 (e.g., the vehicle user may be an owner or a licensee of either or both).

Figure 2:
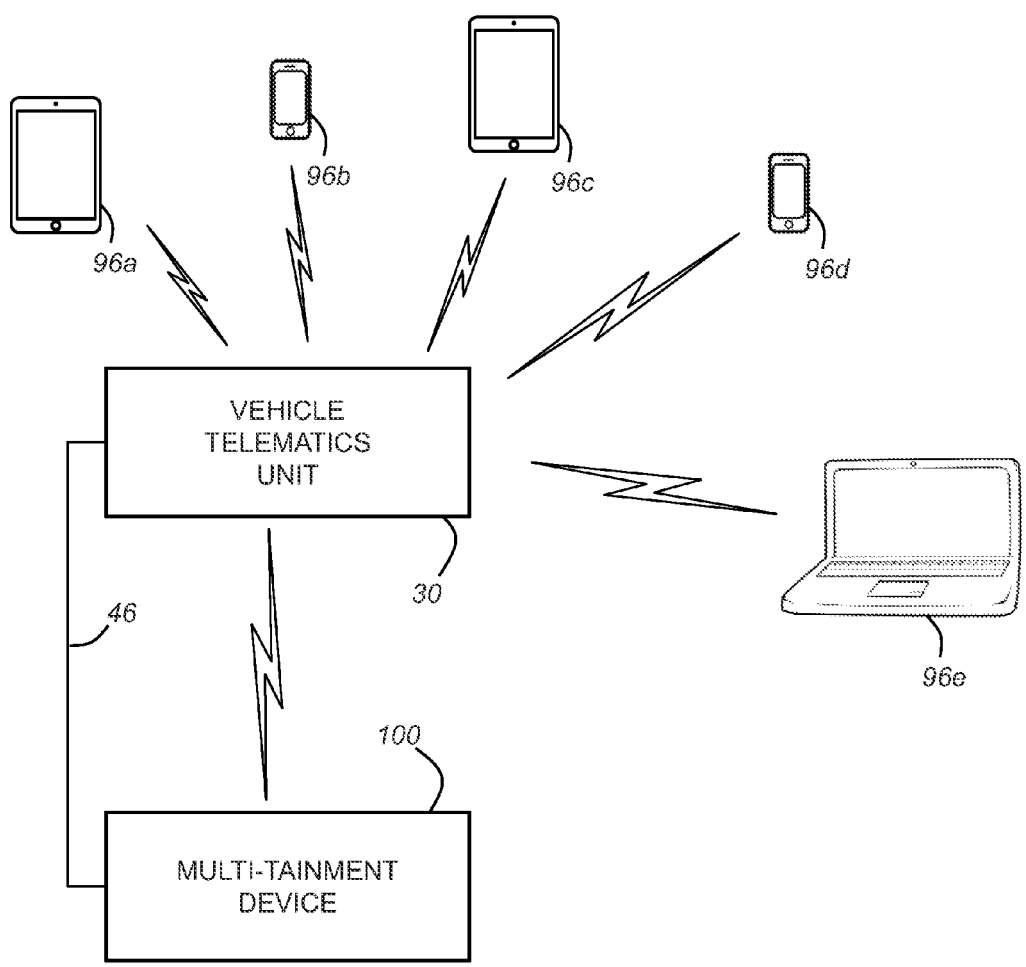
FIG. 2 illustrates one embodiment of a vehicle telematics unit and a vehicle multi-tainment unit communicating with various mobile devices.

Thus in the communication system 10 described above, the telematics unit may interact with a variety of communicative devices including the VMU 100 and the mobile device(s) 96. As shown in FIG. 2, the telematics unit 30 and the VMU 100 are coupled to one another. Here, the VMU is coupled both via SRWC and by using a wired connection; e.g., bus 46. In addition, FIG. 2 shows multiple mobile devices 96a, 96b, 96c, 96d, 96e wirelessly coupled to the telematics unit 30 using SRWC. Mobile devices 96b and 96d are illustrated as Smart phones, mobile devices 96a and 96c are illustrated as SRWC-capable tablet computers, and mobile device 96e is illustrated as a SRWC-capable laptop. These of course are merely examples; and other arrangements and configurations are possible.

Method—

Turning now to FIG. 3, there is shown a flow diagram illustrating a method 300 of using the telematics unit 30 in cooperation with the VMU 100 and a mobile device.

The method begins at step 304 where the telematics unit may be configured or preconfigured to give priority to the VMU 100 over other mobile devices (such as 96a-96e) when wireless hotspot data (e.g., Wi-Fi data) is being requested of and/or delivered from the telematics unit 30 via SRWC. In some instances, step 304 may occur at the time of manufacturing and/or at a manufacturing facility. In other instances, it may occur thereafter—e.g., once the vehicle 12 is transferred or conveyed to the user. In some cases, the configuration may occur at a vehicle service center (e.g., by a trained technician); in other cases, the configuration may result from instructions received via voice or data connections wirelessly provided by the call center 20 or other computer 18.

After the telematics unit 30 is configured, the method may proceed to step 308 and the telematics unit 30 may be connected to or coupled with a first wireless device, e.g., the VMU 100. The coupling may enable SRWC communication therebetween. As shown in FIG. 2, the VMU 100 and the telematics unit 30 may be coupled both by wire and wirelessly (however, this is not required). According to at least one implementation, the coupling may occur by wire first—e.g., the unit 30 and VMU 100 may be paired by wire and may exchange a secret key according to a private key infrastructure; thereafter, the unit 30 and VMU 100 may communicate securely via SRWC using private key encryption. As used herein, the term pairing should be construed broadly to include pairing according to a Bluetooth protocol, bonding according to a Wi-Fi Direct protocol, etc.

The method 300 then may proceed to step 312; here, a unique identifier may be provided by the VMU 100 to the telematics unit 30. The identifier may include a serial number of the VMU or a media access control (MAC) address associated with the VMU 100, just to name a couple of examples. The telematics unit may receive the identifier and uniquely associate it with the VMU (e.g., identify the VMU using the identifier). It should be appreciated that without this identifier, the telematics unit 30 may not identify the VMU (or any other mobile device for that matter) wirelessly coupled thereto via SRWC. Skilled artisans will appreciate that wireless hotspot standards such as Wi-Fi do not provide any mechanism to differentiate between various connected devices.

The method may proceed to step 316 where the telematics unit 30 may receive a request or demand for wireless hotspot data from the VMU 100. Upon receipt of this request, the telematics unit may open and use a priority data channel for transmitting wireless hotspot data to the VMU via SRWC, where the wireless hotspot data is associated with cellular data received via cellular chipset 50. This priority data channel may enable communication between the telematics unit 30 and the VMU 100 to have the greatest priority; i.e., first delivered or transmitted and/or at a preferred or highest data rate with respect to other SRWC-connected devices (such as mobile devices 96a-96e).

The telematics unit may have a predetermined total or maximum wireless hotspot data through-put or bandwidth. As will be appreciated by skilled artisans, the available through-put may depend upon the volume of the wireless hotspot data and a desired transmission rate.

Step 320 may follow step 316. In step 320, the telematics unit may provide the requested wireless hotspot data to the VMU 100 on the priority data channel and at the preferred data rate. This wireless hotspot data may include any suitable data; e.g., in at least some implementations it may include satellite radio or streaming video. In addition, the wireless hotspot data may originate from different sources. For example, some data may originate from the call center 20; other data from a remote server 18, etc.

Following step 320, a second wireless device, e.g., at least one mobile device (e.g., device 96a) may connect or couple with the telematics unit 30, according to any suitable SRWC protocol (step 324).

And afterwards, the mobile device 96a may request or demand wireless hotspot data from the telematics unit 30. This request may be received by the telematics unit (step 328) and thereafter assessed.

In step 332, a determination or assessment may be made that includes determining the amount of available wireless hotspot through-put left; i.e., whether there is any unused portion of the through-put in view of the consumption or usage by the VMU 100. If no through-put is available (or an insufficient amount of through-put is available), the request from the mobile device 96a may be delayed (at least temporarily, as shown at 332a) or altogether ignored. However, if there is available through-put, the method 300 may proceed to step 336.

In step 336, the request by the mobile device 96a may be filled by the telematics unit. The requested wireless hotspot data may be sent over a secondary or general data channel. The secondary data channel may or may not have the same data rate as the priority data channel; e.g., the data rate may be slower.

Thus, wireless hotspot data may be conveyed from the telematics unit 30 to both the VMU 100 and the mobile device 96a simultaneously; however, the data received by the VMU may be received over the priority data channel and the data to the mobile device over the secondary data channel.

It should be appreciated that at least some of the steps of method 300 may occur in a different order; e.g., step 324 may occur prior to step 320.

Also, it should be appreciated that the telematics unit may similarly connect to or couple with mobile devices 96b, 96c, 96d, 96e (at step 324); receive wireless hotspot data requests (at step 328); make respective assessments or determinations (at step 322); and potentially provide wireless hotspot data to each (at step 336)—each additional device yielding priority to the VMU 100. Each of these mobile devices (96b-96e) also may receive wireless hotspot data over secondary data channels and at possibly less than preferred data rates.

Turning now to FIG. 4, there is shown a flow diagram illustrating a method 400 of using the telematics unit 30 in cooperation with the VMU 100 and a mobile device. Some of the illustrated steps are similar to those described above with respect to method 300 (and FIG. 3) and will not be fully re-described below.

The method 400 begins with step 404—configuring the telematics unit; step 404 may be the same or similar to step 304 (FIG. 3). The method then proceeds to step 408.

In step 408, the telematics unit 30 may be coupled to a second wireless device; e.g., the mobile device 96a. Step 408 may be the same or similar to step 324 (FIG. 3). The method then proceeds to step 412.

In step 412, the telematics unit 30 may receive a request or demand for wireless hotspot data from the mobile device 96a via SRWC.

After step 412, the telematics unit 30 may provide the requested wireless hotspot data to the mobile device 96a via SRWC (step 416). In providing the data, the telematics unit may open or use a secondary or general data channel.

The method may proceed to step 420. In step 420, the telematics unit may couple with a first wireless device; e.g., the VMU 100. Step 420 may be the same or similar to step 308 (FIG. 3).

The method may proceed to step 424. In step 424, the telematics unit 30 may receive from the VMU a unique identifier and associate the identifier with only the VMU. This step may be the same or similar to step 312 (FIG. 3), as described above.

The method may then proceed to step 428 and receive a wireless hotspot data request or demand from the VMU 100. As will be described below, the wireless hotspot data requested by VMU 100 will be delivered with higher priority than any wireless hotspot data being delivered to the mobile device 96a.

In step 432, the method 400 may determine or assess the availability of providing wireless hotspot data to both the mobile device 96a and the VMU 100 simultaneously. This determination may include determining the amount of available wireless hotspot through-put left after a priority data channel is opened and used to deliver the requested wireless hotspot data to the VMU 100, where the wireless hotspot data is associated with cellular data received via cellular chipset 50.

The method 400 may proceed to step 436 if no through-put is available (or an insufficient amount of through-put is available). Step 436 may include providing wireless hotspot data to the VMU 100 and delaying any wireless hotspot data to be delivered to the mobile device 96a (at least temporarily). In some instances, this wireless hotspot data to be delivered (to device 96a) may be altogether ignored. Following step 436, the method may proceed to step 432 again and the process may be repeated—i.e., the determination of available through-put for the mobile device 96a.

However, if in step 432 it is determined that there is available wireless hotspot through-put for the mobile device 96a, the method 400 may proceed to step 440. Step 440 may be the same or similar to step 336 providing wireless hotspot data to the device 96a over the secondary channel; in addition, step 440 also includes continuing to provide wireless hotspot data to the VMU 100 over the priority data channel.

As previously described with respect to method 300, steps 408, 412, 416, 432, 436, and/or 440 of method 400 may be repeated with respect to mobile devices 96b, 96c, 96d, and/or 96e.

Thus, there has been described a vehicle multi-tainment unit (VMU) that may receive wireless hotspot data from a vehicle telematics unit equipped with wireless hotspot functionality. In addition, the telematics unit may provide similar data wirelessly to various other mobile devices in or near the vehicle. Where wireless hotspot data is being transmitted simultaneously to the VMU and one or more mobile devices, the telematics unit may prioritize its available wireless hotspot bandwidth so that the VMU has the highest priority. In addition, the VMU may receive its requested wireless hotspot data at a preferred data rate—which may be faster than that provided to the mobile device(s).

The method(s) may be performed as one or more computer programs executable by one or more computing devices of or in communication with a vehicle telematics system to cause the system and/or the computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

In one embodiment, the performed method(s) include computer programs executable using the VMU processor and memory (including VMU software stored thereon), the telematics unit processor and memory (including telematics unit software stored thereon), and/or the mobile device processor and memory (including mobile device software stored thereon).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing multi-tainment services in a vehicle, comprising the steps of:
   (a) operating a telematics unit in the vehicle as a short range wireless communication (SRWC) wireless hotspot;
   (b) receiving at a telematics unit in the vehicle an identifier from a vehicle multi-tainment unit (VMU) in the vehicle;
   (c) establishing a priority data channel between the telematics unit and the VMU based on the identifier and establishing between the telematics unit and at least one mobile device a secondary data channel via the SRWC wireless hotspot; and
   (d) providing data to the VMU via the priority data channel according to a first through-put demand and providing data to the at least one mobile device via the secondary data channel according to a second through-put demand, wherein, if first and second through-put demands exceed a through-put capacity that can be provided by the telematics unit, then providing from the telematics unit the first through-put demand before providing the second through-put demand.

2. The method of claim 1, wherein the identifier is a media access control (MAC) address.

3. The method of claim 1, wherein the SRWC wireless hotspot operated by the telematics unit is a Wi-Fi protocol.

4. The method of claim 1, wherein the identifier is received by the telematics unit over a wired vehicle connection, and wherein the priority data channel between the telematics unit and the VMU is established via the SRWC wireless hotspot.

5. The method of claim 1, wherein the telematics unit has a predetermined total wireless hotspot data through-put.

6. A method of providing multi-tainment services in a vehicle, comprising the steps of:
(a) providing a telematics unit having wireless hotspot functionality;
(b) connecting the telematics unit via short range wireless communication (SRWC) to a vehicle multi-tainment unit (VMU) and at least one mobile device;
(c) identifying the VMU connection at the telematics unit; and
(d) providing the VMU with wireless hotspot data priority over the at least one mobile device,
wherein the telematics unit has a predetermined total wireless hotspot data through-put, and wherein step (d) further comprises:
(d1) providing to the VMU demanded VMU wireless hotspot data at a first rate;
(d2) receiving from the at least one mobile device a request for demanded mobile device wireless hotspot data; and
(d3) determining an unused portion of the total wireless hotspot data through-put.

7. The method of claim 6, further comprising:
when the unused portion is greater than zero, then either:
(d4) providing to the at least one mobile device the demanded mobile device wireless hotspot data at a second rate; or
(d5) at least temporarily inhibiting step (d4).

8. The method of claim 7, wherein either the first rate is the same as the second rate, or the second rate is slower than the first rate.

9. The method of claim 6, further comprising performing step (d) for a plurality of mobile devices.

10. The method of claim 6, wherein step (d) further comprises:
(d1) providing to the at least one mobile device demanded mobile device wireless hotspot data at a first rate;
(d2) receiving from the VMU a request for demanded VMU wireless hotspot data; and
(d3) determining an unused portion of the total wireless hotspot data through-put.

11. The method of claim 10, further comprising:
when the unused portion is greater than zero, then:
(d4) determining whether the unused portion of the total wireless hotspot data through-put is sufficient to provide the VMU the demanded VMU wireless hotspot data at a second rate, wherein the second rate is either equal to or faster than the first rate;
(d5) when the unused portion is sufficient, providing VMU the demanded VMU wireless hotspot data at the second rate; and
(d6) when the unused portion is not sufficient, then either:
decreasing the first rate of demanded mobile device wireless hotspot data to the at least one mobile device; or
inhibiting, at least temporarily, the providing of demanded mobile device wireless hotspot data to the at least one mobile device; and
when the unused portion is zero, then either
decreasing the first rate of demanded mobile device wireless hotspot data to the at least one mobile device; or
inhibiting, at least temporarily, the providing of demanded mobile device wireless hotspot data to the at least one mobile device.

12. The method of claim 11, wherein when the telematics unit is providing wireless hotspot data to both the VMU and the at least one mobile device and when the demanded mobile device wireless hotspot data increases affecting the second rate of wireless hotspot data to the VMU, then either:
inhibiting, at least temporarily, the providing of demanded mobile device wireless hotspot data to the at least one mobile device, or
decreasing the first rate.

13. A method of providing wireless hotspot data from a vehicle telematics unit to devices in or near a vehicle, comprising the steps of:
(a) receiving at the telematics unit a unique identifier from a vehicle multi-tainment unit (VMU) in the vehicle;
(b) using short range wireless communication (SRWC), establishing a first hotspot session between the telematics unit and the VMU, wherein the telematics unit is capable of providing wireless hotspot functionality having a predetermined total wireless hotspot data bandwidth;
(c) using SRWC, establishing a second hotspot session between the telematics unit and a mobile device in or near the vehicle; and
(d) based on the unique identifier, granting at the telematics unit data priority to the first hotspot session by providing data to the VMU at a data rate higher than data provided to the mobile device via the second hotspot session.

14. The method of claim 13, further comprising ceasing to provide data to the mobile device when a through-put demand of the VMU approaches or equals the predetermined total wireless hotspot data bandwidth.

15. The method of claim 13, wherein based on the unique identifier, the VMU communicates with the telematics unit using SRWC over a priority data channel.

* * * * *